(12) United States Patent
Green et al.

(10) Patent No.: US 8,296,297 B2
(45) Date of Patent: *Oct. 23, 2012

(54) CONTENT ANALYSIS AND CORRELATION (75) Inventors: Tammy Green, Provo, UT (US);
Stephen R. Carter, Spanish Fork, UT (US); Scott Alan Isaacson, Kamuela, HI (US)

(73) Assignee: Novell, Inc., Provo, UT (US)

( * ) Notice: Subject to any disclaimer, the term of this patent is extended or adjusted under 35 U.S.C. 154(b) by 503 days.

This patent is subject to a terminal disclaimer.

(21) Appl. No.: 12/346,662

(22) Filed: Dec. 30, 2008

(65) Prior Publication Data

US 2010/0169314 A1    Jul. 1, 2010

(51) Int. Cl.
G06F 7/00 (2006.01)
G06F 17/30 (2006.01)

(52) U.S. Cl. ........................... 707/736; 707/739
(58) Field of Classification Search .................. None
See application file for complete search history.

(56) References Cited

U.S. PATENT DOCUMENTS

| | | |
|---|---|---|
| 5,276,677 A | 1/1994 | Ramamurthy et al. |
| 5,278,980 A | 1/1994 | Pedersen et al. |
| 5,317,507 A | 5/1994 | Gallant |
| 5,325,298 A | 6/1994 | Gallant |
| 5,325,444 A | 6/1994 | Cass et al. |
| 5,390,281 A | 2/1995 | Luciw et al. |
| 5,412,804 A | 5/1995 | Krishna |
| 5,499,371 A | 3/1996 | Henninger et al. |
| 5,524,065 A | 6/1996 | Yagasaki |
| 5,539,841 A | 7/1996 | Hutlenlocher et al. |
| 5,551,049 A | 8/1996 | Kaplan et al. |
| 5,619,709 A | 4/1997 | Caid et al. |
| 5,675,819 A | 10/1997 | Schuetze |
| 5,694,523 A | 12/1997 | Wical |
| 5,696,962 A | 12/1997 | Kupiec |
| 5,708,825 A | 1/1998 | Sotomayor |
| 5,721,897 A | 2/1998 | Rubinstein |
| 5,724,567 A | 3/1998 | Rose et al. |
| 5,768,578 A | 6/1998 | Kirk et al. |
| 5,778,362 A | 7/1998 | Deerwester |
| 5,778,378 A | 7/1998 | Rubin |
| 5,778,397 A | 7/1998 | Kupiec et al. |
| 5,794,178 A | 8/1998 | Caid et al. |
| 5,799,276 A | 8/1998 | Komissarchik et al. |
| 5,821,945 A | 10/1998 | Yeo et al. |

(Continued)

OTHER PUBLICATIONS

"Method and apparatus for semantic characterization of general content streams and repositories", U.S. Appl. No. 09/109,084, filed Jul. 2, 1998 (now U.S. Patent No. 6,108,619).

(Continued)

*Primary Examiner* — Shyue Jiunn Hwa
*Assistant Examiner* — Tuan A Pham
(74) *Attorney, Agent, or Firm* — Marger Johnson & McCollom, P.C.

(57) ABSTRACT

A content analysis and correlation service system can include a summary manager service for generating content correlation summaries, wherein the generated content correlation summaries are based on discovered content and analyzed content based on the discovered content. The system can include a content search manager service for generating the discovered content based on search criteria and correlation criteria and a semantic analysis service for generating the analyzed content based on the discovered content. The system can also include a data store for storing the generated content correlation summaries and a notification service for providing notifications based on the generated content correlation summaries.

11 Claims, 9 Drawing Sheets

U.S. PATENT DOCUMENTS

| | | | |
|---|---|---|---|
| 5,822,731 A | 10/1998 | Schultz | |
| 5,832,470 A | 11/1998 | Morita et al. | |
| 5,867,799 A | 2/1999 | Lang et al. | |
| 5,873,056 A | 2/1999 | Liddy et al. | |
| 5,873,079 A | 2/1999 | Davis, III et al. | |
| 5,934,910 A | 8/1999 | Ho et al. | |
| 5,937,400 A | 8/1999 | Au | |
| 5,940,821 A | 8/1999 | Wical | |
| 5,963,965 A | 10/1999 | Vogel | |
| 5,966,686 A | 10/1999 | Heidorn et al. | |
| 5,970,490 A | 10/1999 | Morgenstern | |
| 5,974,412 A | 10/1999 | Hazlehurst et al. | |
| 5,991,713 A | 11/1999 | Unger et al. | |
| 5,991,756 A | 11/1999 | Wu | |
| 6,006,221 A | 12/1999 | Liddy et al. | |
| 6,009,418 A | 12/1999 | Cooper | |
| 6,015,044 A | 1/2000 | Peterson | |
| 6,041,311 A | 3/2000 | Chislenko et al. | |
| 6,076,088 A | 6/2000 | Paik et al. | |
| 6,078,953 A | 6/2000 | Vaid et al. | |
| 6,085,201 A | 7/2000 | Tso | |
| 6,097,697 A | 8/2000 | Yao et al. | |
| 6,105,044 A | 8/2000 | DeRose et al. | |
| 6,108,619 A | 8/2000 | Carter et al. | |
| 6,122,628 A | 9/2000 | Castelli | |
| 6,134,532 A * | 10/2000 | Lazarus et al. | 705/14.25 |
| 6,141,010 A | 10/2000 | Hoyle | |
| 6,173,261 B1 | 1/2001 | Arai et al. | |
| 6,205,456 B1 | 3/2001 | Nakao | |
| 6,263,335 B1 | 7/2001 | Paik et al. | |
| 6,269,362 B1 | 7/2001 | Broder et al. | |
| 6,289,353 B1 | 9/2001 | Hazlehurst et al. | |
| 6,292,792 B1 | 9/2001 | Baffes et al. | |
| 6,295,092 B1 | 9/2001 | Hullinger et al. | |
| 6,295,533 B2 | 9/2001 | Cohen | |
| 6,297,824 B1 | 10/2001 | Hearst et al. | |
| 6,311,194 B1 | 10/2001 | Sheth et al. | |
| 6,317,708 B1 | 11/2001 | Witbrock et al. | |
| 6,317,709 B1 | 11/2001 | Zack | |
| 6,356,864 B1 | 3/2002 | Foltz et al. | |
| 6,363,378 B1 | 3/2002 | Conklin et al. | |
| 6,415,282 B1 | 7/2002 | Mukherjea et al. | |
| 6,446,061 B1 | 9/2002 | Doerre et al. | |
| 6,446,099 B1 | 9/2002 | Peairs | |
| 6,459,809 B1 | 10/2002 | Jensen et al. | |
| 6,460,034 B1 | 10/2002 | Wical | |
| 6,470,307 B1 | 10/2002 | Turney | |
| 6,493,663 B1 | 12/2002 | Ueda | |
| 6,513,031 B1 | 1/2003 | Fries et al. | |
| 6,523,026 B1 | 2/2003 | Gillis | |
| 6,606,620 B1 | 8/2003 | Sundaresan et al. | |
| 6,615,208 B1 | 9/2003 | Behrens et al. | |
| 6,615,209 B1 | 9/2003 | Gomes et al. | |
| 6,675,159 B1 | 1/2004 | Lin et al. | |
| 6,732,080 B1 | 5/2004 | Blants | |
| 6,754,873 B1 | 6/2004 | Law et al. | |
| 7,103,609 B2 | 9/2006 | Elder et al. | |
| 7,117,198 B1 | 10/2006 | Cronin et al. | |
| 7,152,031 B1 | 12/2006 | Jensen et al. | |
| 7,286,977 B1 | 10/2007 | Carter et al. | |
| 7,389,225 B1 * | 6/2008 | Jensen et al. | 704/9 |
| 7,401,087 B2 | 7/2008 | Copperman et al. | |
| 7,475,008 B2 | 1/2009 | Jensen et al. | |
| 7,562,011 B2 | 7/2009 | Carter et al. | |
| 7,949,728 B2 | 5/2011 | Rivette et al. | |
| 2002/0161747 A1 * | 10/2002 | Li et al. | 707/3 |
| 2003/0033301 A1 | 2/2003 | Cheng et al. | |
| 2003/0217047 A1 | 11/2003 | Marchisio | |
| 2004/0122841 A1 | 6/2004 | Goodman et al. | |
| 2004/0254920 A1 * | 12/2004 | Brill et al. | 707/3 |
| 2005/0144162 A1 * | 6/2005 | Liang | 707/3 |
| 2006/0020593 A1 * | 1/2006 | Ramsaier et al. | 707/5 |
| 2006/0287898 A1 | 12/2006 | Murashita et al. | |
| 2007/0061301 A1 | 3/2007 | Ramer et al. | |
| 2007/0106491 A1 | 5/2007 | Carter et al. | |
| 2007/0106651 A1 * | 5/2007 | Isaacson et al. | 707/3 |
| 2007/0233671 A1 | 10/2007 | Oztekin et al. | |
| 2008/0027924 A1 * | 1/2008 | Hamilton et al. | 707/5 |
| 2008/0126172 A1 | 5/2008 | Melamed et al. | |
| 2008/0222574 A1 * | 9/2008 | Coyne | 715/856 |
| 2008/0235189 A1 * | 9/2008 | Rayman et al. | 707/3 |
| 2008/0235220 A1 | 9/2008 | Chen et al. | |
| 2009/0063467 A1 * | 3/2009 | Abhyanker | 707/5 |
| 2010/0082660 A1 * | 4/2010 | Muilenburg et al. | 707/768 |
| 2010/0274815 A1 | 10/2010 | Vanasco | |

OTHER PUBLICATIONS

"CANDID Executive Summary"; Nov. 19, 1998; pp. 1-4.

"Methodology"; 1997; pp. 1-5.

"Platform for Internet Content Selection (PICS)" htto://www.w3.org; 1997-2003; pp. 1-8.

"WordNet—a lexical database for the English language"; Cognitive Science Laboratory, Princeton University, www.cogsci.princeton.edu; printed on Nov. 5, 2004; 2 pages.

Bartell et al., "Latent Semantic Indexing is an Optimal Special Case of Multidimensional Scaling"; Dept. of Computer Science & Engineering; University of California, San Diego; 1992; 7 pages.

Chakrabarti, Soumen, Dom, Byron, Kumar, S. Ravi, Raghavan, Prabhakar, Rajagopalan, Sridhar, and Tomkins, Andrew, "Hypersearching the Web"; Scientific American, Jun. 1999; pp. 54-60.

Chomsky, Noam, "Language and Thought"; 1993; pp. 18-19, 22-27, 44-45, 60-61.

Chomsky, Noam, "The Minimalist Program"; 1995; pp. 13-127.

Chu et al., "Knowledge-Based image retrieval with spatial and temporal constructs"; IEEE; Nov. 1998; pp. 872-888.

Cook, Vivian and Newson, Mark, "Chomsky's Universal Grammar—An Introduction"; 1988; pp. 40-74, 131-272.

Culler, Jonathan, "Ferdinand de Saussure—Revised Edition"; 1986; pp. 38-57.

Deng, "Ne Tra-V: Toward an object based video representation"; IEEE; Sep. 1998; pp. 616-627.

Eco, Umberto, "Semiotics and the Philosophy of Language"; 1984; pp. 46-86.

Eco, Umberto, Santambrogio, Marco, and Violi, Patrizia (editors), "Meaning and Mental Representations"; 1988; p. 221.

Edwards R. E., "Functional Analysis: Theory and Applications"; 1965; pp. 10-13, 32-33, 50-53, 62-65, 88-103, 174-203, 224-233.

EPIC Report, "Faulty Filters: How content filters block access to kid-friendly information on the internet"; 1997; pp. 1-8.

Faudemay et al., "Intelligent delivery of personalized video programmes from a video database"; IEEE; 1997; pp. 172-177.

Geiger et al., "Dynamic programming for detecting, tracking, and matching deformable contours"; 1995; pp. 294-302.

Gudivada et al., "Design and evaluation of algorithms for image retrieval by spatial similarity"; 1995; pp. 116-144.

Halmos, Paul R., "Naïve Set Theory"; Undergraduate Texts in Mathematics, Litton Educational Publishing; 1960; Springer-Verlag, New York, NY; 1974; pp. 56-57, 66-69.

Han et al., "Image organization and retrieval with automatically constructed feature vectors"; 1996.

Hocking, John G. and Young, Gail S., "Topology"; 1961; pp. 6-7, 56-59, 68-71.

Hsu et al., "A Knowledge-Based Approach for retrieving images by content", IEEE; Aug. 1996; pp. 522-532.

Hutson, V. and Pym, J.S., "Applications of Functional Analysis and Operator Theory"; 1980; index, preface, and Table of Contents.

"Intelligent Collaboration & Visualization"; pp. 1-16.

Jain et al., "Object matching using deformable templates"; IEEE; 1996; pp. 267-278.

Kahn, Donald W., "Topology: An Introduction to the Point-Set and Algebraic Areas"; 1975; pp. 10-15.

Khare, Rohit and Rifkin, Adam, "Capturing the State of Distributed Systems with XML"; Oct. 26, 1997; pp. 1-12.

Kupeev et al., "On shape similarity"; IEEE; 1994; pp. 227-231.

Liu et al., "Partial shape classification using contour matching in distance transformation"; IEEE; Nov. 1990; pp. 1072-1080.

Lundquist, Carol, Grossman, David A., and Frieder, Ophir, "Improving Relevance Feedback in the Vector Space Model"; 1997; ACM 0-89791-970-X; pp. 16-23.

Mahesh, "Ontology Development for Machine Translation: Ideology and Method"; Computing Research Laboratory, New Mexico State University; 1996; 1-79.

Mehrotra et al., "Feature based retrieval of similar shapes"; IEEE; 1993; pp. 108-115.

Mehrotra et al., "Similar-shape retrieval in shape data management"; IEEE; 1995; pp. 57-62.

Meier et al., "Segmentation and tracking of moving objects for content-based video coding"; IEEE; Jun. 1999; pp. 144-150.

Mostafa et al., "A Multilevel Approach to Intelligent Information Filtering: Model. System, and Evaluation"; ACM Transactions on Information Systems, vol. 15, No. 4; Oct. 1997; pp. 368-399.

Nes et al., "Region-based indexing in an image database"; 1997; pp. 1-9.

Onyshkevych, B. et al., "A Lexicon for Knowledge-Based MT"; Machine Translation; 1995; pp. 1-49.

Ozer et al., "A graph based object description for information retrieval in digital image and video libraries"; IEEE; Jun. 22, 1999; pp. 1-4.

Pejtersen, Annelise Mark, "Semantic Information Retrieval"; Communications of the ACM, vol. 41, No. 5; Apr. 1998; pp. 90-92.

Pesetsky, David, "Zero Syntax Experiencers and Cascades"; 1995; pp. 1-122.

Ravela et al., "Retrieving images by similarity of visual appearance", IEEE; 1997; pp. 67-74.

Saber et al., "Integration of color, shape and texture for image annotation and retrieval"; IEEE; 1996; pp. 851-854.

Singh, "Unifying Heterogeneous Information Models"; Tesserae Information Systems, Inc., http://citeseer.ist.psu.edu.com; printed on Nov. 5, 2004; pp. 1-13.

Smith et al., "Searching for images and videos on the world-wide web"; 1996; pp. 1-17.

Smith, George W., "Computers and Human Language"; 1991; pp. 205-257.

Vapillon et al., "Analyzing and filtering contour deformation"; IEEE; 1998; pp. 267-271.

Wired News, "SurfWatch Allowed Key Patent"; Nov. 16, 1998, pp. 1-3.

Yang et al., "A similarity measure of deformable shapes"; IEEE; 1997; pp. 1455-1459.

Aman et al., "Identifying Expressions of Emotion in Text", TSD 2007, LNAI 4629, pp. 196-205.

Neviarouskaya et al., "Narrowing the Social Gap among People Invoiced in Global Dialogue: Automatic Emotion Detection in Blog Posts", ICWSM, 2007 (2 pages).

Schneier, B., "Anonymity and the Netflix Database", retrieved from http://www.schneier.com/blog/archives/2007/12; Dec. 18, 2007 (2 pages).

Schneier, B., "Why Anonymous Data Sometimes Isn't", retrieved from http://www.wired.com/politics/security/commentary/securitymatters/2007/12/securitymatters_1213; Dec. 13, 2007 (3 pages).

* cited by examiner

FIG. 9

CONTENT ANALYSIS AND CORRELATION

CROSS-REFERENCE TO RELATED APPLICATIONS

This application is related to and commonly owned U.S. patent application Ser. No. 11/929,678, titled "CONSTRUCTION, MANIPULATION, AND COMPARISON OF A MULTI-DIMENSIONAL SEMANTIC SPACE," filed on Oct. 30, 2007, which is a divisional of U.S. patent application Ser. No. 11/562,337, filed on Nov. 21, 2006, which is a continuation of U.S. patent application Ser. No. 09/512,963, filed Feb. 25, 2000, now U.S. Pat. No. 7,152,031, issued on Dec. 19, 2006. All of the foregoing applications are fully incorporated by reference herein.

This application is also related to and commonly owned U.S. patent application Ser. No. 11/616,154, titled "SYSTEM AND METHOD OF SEMANTIC CORRELATION OF RICH CONTENT," filed on Dec. 26, 2006, which is a continuation-in-part of U.S. patent application Ser. No. 11/563,659, titled "METHOD AND MECHANISM FOR THE CREATION, MAINTENANCE, AND COMPARISON OF SEMANTIC ABSTRACTS," filed on Nov. 27, 2006, which is a continuation of U.S. patent application Ser. No. 09/615,726, filed on Jul. 13, 2000, now U.S. Pat. No. 7,197,451, issued on Mar. 27, 2007; and is a continuation-in-part of U.S. patent application Ser. No. 11/468,684, titled "WEB-ENHANCED TELEVISION EXPERIENCE," filed on Aug. 30, 2006; and is a continuation-in-part of U.S. patent application Ser. No. 09/691,629, titled "METHOD AND MECHANISM FOR SUPERPOSITIONING STATE VECTORS IN A SEMANTIC ABSTRACT," filed on Oct. 18, 2000, now U.S. Pat. No. 7,389,225, issued on Jun. 17, 2008; and is a continuation-in-part of U.S. patent application Ser. No. 11/554,476, titled "INTENTIONAL-STANCE CHARACTERIZATION OF A GENERAL CONTENT STREAM OR REPOSITORY," filed on Oct. 30, 2006, which is a continuation of U.S. patent application Ser. No. 09/653,713, filed on Sep. 5, 2000, now U.S. Pat. No. 7,286,977, issued on Oct. 23, 2007. All of the foregoing applications are fully incorporated by reference herein.

This application is also related to and commonly owned U.S. patent application Ser. No. 09/710,027, titled "DIRECTED SEMANTIC DOCUMENT PEDIGREE," filed on Nov. 7, 2000, which is fully incorporated by reference herein.

This application is also related to and commonly owned U.S. patent application Ser. No. 11/638,121, titled "POLICY ENFORCEMENT VIA ATTESTATIONS," filed on Dec. 13, 2006, which is a continuation-in-part of U.S. patent application Ser. No. 11/225,993, titled "CRAFTED IDENTITIES," filed on Sep. 14, 2005, and is a continuation-in-part of U.S. patent application Ser. No. 11/225,994, titled "ATTESTED IDENTITIES," filed on Sep. 14, 2005. All of the foregoing applications are fully incorporated by reference herein.

This application is also related to and fully incorporates by reference the following commonly owned patent applications: U.S. patent application Ser. No. 12/267,279, titled "PREDICTIVE SERVICE SYSTEMS," filed on Nov. 7, 2008; U.S. patent application Ser. No. 12/346,657, titled "IDENTITY ANALYSIS AND CORRELATION," filed on Dec. 30, 2008; and U.S. patent application Ser. No. 12/346,665, titled "ATTRIBUTION ANALYSIS AND CORRELATION," filed on Dec. 30, 2008.

This application also fully incorporates by reference the following commonly owned patents: U.S. Pat. No. 6,108,619, titled "METHOD AND APPARATUS FOR SEMANTIC CHARACTERIZATION OF GENERAL CONTENT STREAMS AND REPOSITORIES," U.S. Pat. No. 7,177,922, titled "POLICY ENFORCEMENT USING THE SEMANTIC CHARACTERIZATION OF TRAFFIC," and U.S. Pat. No. 6,650,777, titled "SEARCHING AND FILTERING CONTENT STREAMS USING CONTOUR TRANSFORMATIONS," which is a divisional of U.S. Pat. No. 6,459,809.

TECHNICAL FIELD

The disclosed technology pertains to systems and methods for correlating one or more personas with content on a network.

BACKGROUND

As various types of content and attributions proliferate on the Internet, it becomes increasingly difficult to ascertain and maintain a summary and/or analysis of the contribution(s) of any given contributor. Indeed, some contributors have multiple personas, some contributors have anonymous personas, and some contributors have both. As a result, any effort to track the contributions of each persona becomes increasingly difficult. Tracking a large number of contributors (who may each have multiple personas, for example) concerning even a single event is typically a difficult task. For example, during an election year in the United States, any tracking and/or evaluation of different types of contributions from a large number of contributors concerning the U.S. presidential race quickly becomes unmanageable, particularly as the actual election date approaches.

SUMMARY

Implementations of the disclosed technology can provide systems and methods for advantageously defining search criteria and correlation criteria, analyzing content, correlating content, and providing a summary and/or detailed analysis of content and semantic summaries as well as summaries of correlation results, for example, in light of persona content, prior analysis, and community membership information. Such systems and methods can, for example, provide for search criteria and correlation criteria in light of a large number of personas and a wide variety of community membership.

A content analysis and correlation system can include a content searching service, a semantic analysis service, and a summary generation service. The content searching service can include a content search manager operable to coordinate with multiple search engines to run queries against content such as private content and public content. The queries can be built based at least in part on search criteria and correlation criteria that can be provided by the user, for example, and the search results can be stored as discovered content.

The semantic analysis service can be used to generate analyzed content based at least in part on the discovered content. The summary generation service can be used to generate summaries based at least in part on persona information and content, the discovered content, and the analyzed content.

DETAILED DESCRIPTION

"When is the last time you Googled yourself?" has become a common question in today's world. Discovering what content is on the Internet concerning a user and/or one or more of the user's personas can be critical to the user's real-life activities. For example, it is common for a head hunter to investigate a person that is being considered for a senior-level position to ascertain qualifications (e.g., by performing an online search, such as a Google search, on the candidate).

While notations on the Internet are not definitive (or even valid, in some cases), content is generally trusted and considered to be valid, at least to some degree. In addition, the sheer volume of content on the Internet can provide a unique view into certain perception concerning an event.

In "The Wisdom of Crowds," author James Surowiecki notes that the consensus of the masses will often home in on the truth or reality surrounding an event. Thus, an individual might be interested in knowing what the consensus is concerning an event or how the consensus compares to the position of the individual's persona(s). Likewise, a user may want to evaluate the impact of a statement on the Internet or in a specific community. For example, a user might desire to know the impact, if any, of his or her latest posting concerning his or her "friends" on Facebook.

Exemplary Content Analysis and Correlation Services

Figure 1:
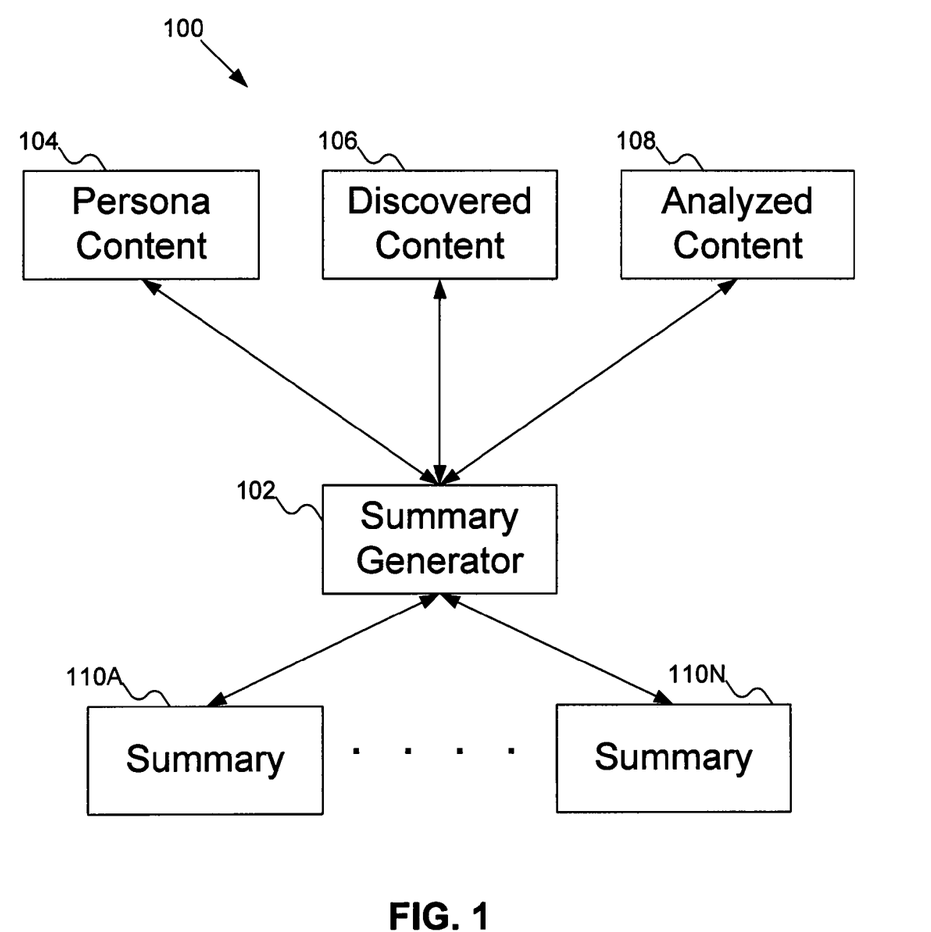
FIG. 1 shows an example of a content analysis and correlation service in accordance with embodiments of the disclosed technology.

FIG. 1 shows an example of a content analysis and correlation service 100 in accordance with embodiments of the disclosed technology. A summary generator 102 can receive as input information pertaining to persona content 104, discovered content 106, and analyzed content 108, all of which are discussed in detail below. The summary generator 102 can produce as output N summaries 110A through 110N, which can be used to advise a user of content that references either the persona directly or a semantic position of the persona.

Additionally, the content analysis and correlation service 100 can constantly advisor the user as to how the world is currently viewing a particular persona or an event as it pertains to the persona (such as an event in the news or an announcement from a competitor, for example).

The summaries 110A through 110N can be stored (e.g., in local memory or in a database) and/or outputted to a display. In certain embodiments, a dashboard (not shown) can be used to provide a graphical representation of certain information pertaining to one or more of the summaries 110A through 110N.

Exemplary Personas

As used herein, a persona generally refers to an identity (e.g., a generated identity) that can allow the true identity of a user to remain anonymous. A persona can include a simple declaration of identity (such as an email address, for example) or it can include a more sophisticated declaration (such as a tokenized identity or a crafted identity, for example).

In certain embodiments, an identity record can be provided for each persona, wherein the identity record can specify in detail identity information (e.g., identity attributes) pertaining to the persona. Such identity attributes can be marked as private or public, thereby indicating which identity attributes are to be kept private (e.g., not disclosed to others) during collaboration such as a user group collaboration on a network.

In certain embodiments, a user can provide links to of his or her membership or association with one or more communities (e.g., online user group). The user can also provide summaries of his or her persona's membership in a particular community. In general, a user's persona can be a member of many different communities. Also, different personas (e.g., multiple personas corresponding to the same user) can belong to the same community. For any given community, for example, a member user can provide a statement of intent describing why the user's pertinent persona is a member of the community and what the user hopes to gain by the persona's membership in the community. In certain embodiments, such a statement of intent is advantageously withheld (e.g., not shared) with the rest of the community. Other information concerning the persona's membership in the community can also be withheld from the community.

Exemplary Persona Generation Services

Figure 2:
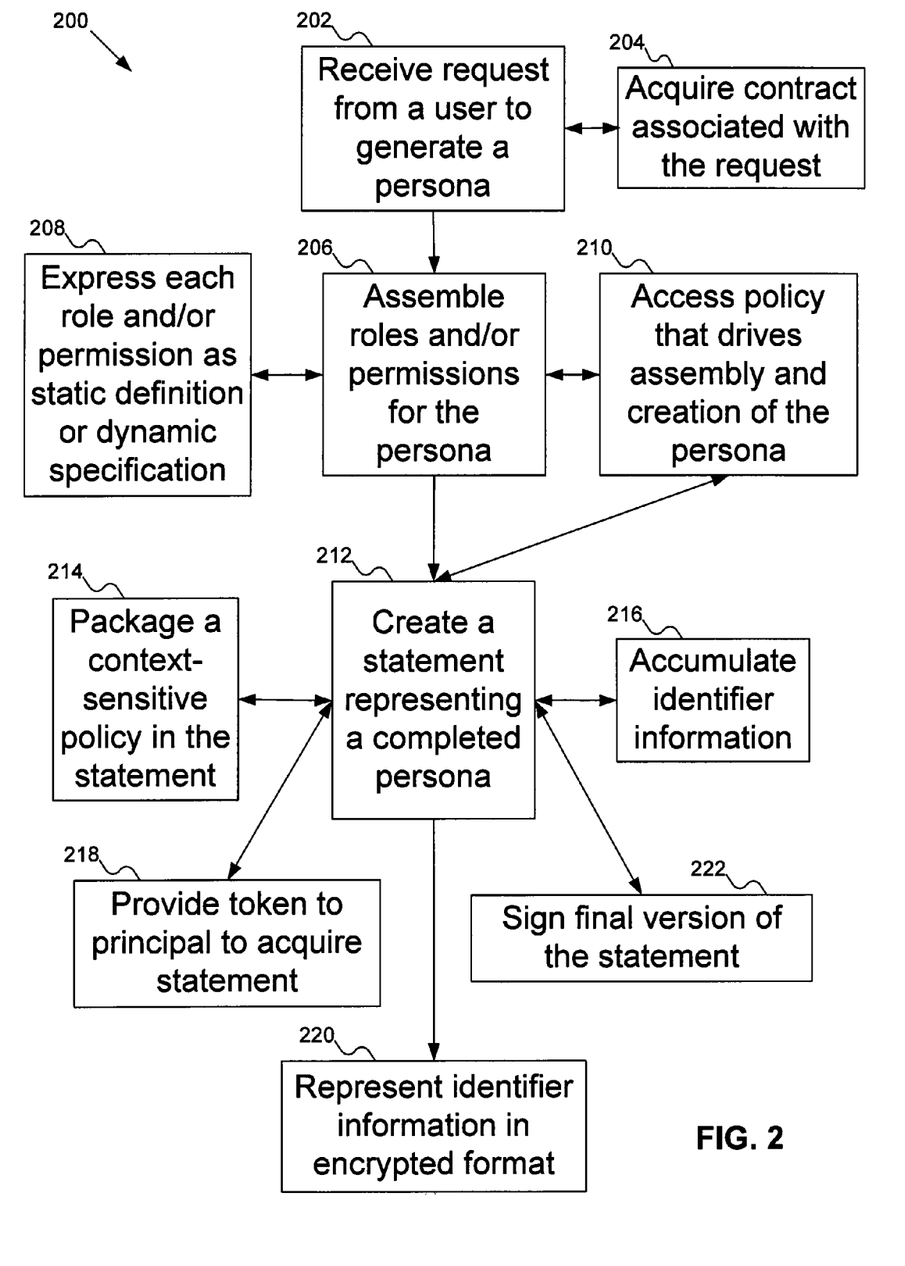
FIG. 2 shows an example of a persona generation service suitable for generating a persona in accordance with embodiments of the disclosed technology.

FIG. 2 shows an example of a persona generation service 200 suitable for generating a persona in accordance with embodiments of the disclosed technology. The persona generation service 200 can be implemented in a tangible, machine-readable medium, for example. The persona generation service 200 can generate a persona on behalf of a principal requester or principal (e.g., any type of resource making a request for a persona, such as a user, a group of users, or an automated service). The persona generation service 200 can also generate multiple personas on behalf of the principal.

A principal generally authenticates to the persona generation service 200 when requesting a persona. That is, the persona generation service 200 and the principal are said to be in a trust relationship with one another and can thus communicate with one another securely. Also, the persona generation service 200 has access to identifiers and secrets of the principal, which are generally directed to the true identity of the principal. The secure communication is generally directed toward establishing a persona and, within this context, the persona generation service 200 can validate identifiers of the principal to assure the persona generation service 200 of the identity of the principal for the context.

The persona generation service 200 can receive a request from a principal to create a persona, as shown at 202. Once created, such a persona can advantageously preserve the anonymity of the principal and thereby prevent resources from accessing information about the principal (except, in some instances, for information that is included within an identity record associated with the persona).

The persona generation service 200 can acquire a contract associated with the request for the persona, as shown at 204. The contract typically identifies or defines certain policies that are enforced during creation of the persona, for example. The contract may also identity the type of persona to be created.

The persona generation service 200 can assemble roles (e.g., designations recognized within the context of a given resource, such as administrator, supervisor, and visitor) and/or permissions (e.g., access rights for a given role on a given resource, such as read access, write access, and read/write access) for the persona, as shown at 206.

The roles and/or permissions for the persona can be expressed as a static definition or a dynamic specification, as shown at 208. A static definition can be predefined for a given role. Thus, resolution of permissions for a given role are typically fully calculated and declared once assembled for the persona. Conversely, the roles and/or permissions can be expressed within a specification associated with the persona.

The persona generation service 200 can access one or more policies that drive the assembly and creation of the persona and its associated information, as shown at 210. A policy can dictate what is included and what is not included in the personal and related information.

A statement or related information representing a completed persona can be created, as shown at 212. The roles and/or permissions, attributes, and identifier information for the newly created persona can be packed in a format defined by a policy or other specification.

The persona generation service 200 can package a context-sensitive policy in the statement, as shown at 214. The context-sensitive policy can permit the persona to be managed from different environments based on the context. Certain context-sensitive policies can permit the principal to determine access rights based on the contexts or environments within which the desired resource is being accessed by the principal associated with the persona.

The persona generation service 200 can accumulate identifier information from a variety of identity vaults or identifier repositories, as shown at 216. The identifier information can include attributes concerning the principal that, according to a policy, are to be exposed in the persona. The resource can use these attributes to validate the persona. The identifier information can include a key and/or a certificate, for example. The identifier information typically prevents the resource validating from acquiring additional identifier information about the principal. Once the resource validates the persona presented by the principal, the principal can assume the persona within the context of accessing the resource and can desirably remain anonymous to the resource. Thus, the resource is assured that it is dealing with a legitimate and uncompromised identity.

The persona generation service 200 can maintain and manage the persona. For example, a statement can be provided to the principal on an as-needed or dynamic basis whenever the principal desires to use it to access a given resource. Rather than directly providing the statement representing the persona to the principal, the creation service can provide a token to the principal such that the principal can acquire the statement when desired using the token, as shown at 218.

The persona generation service 200 can represent the identifier information of the persona that is included in the statement in an encrypted format, as shown at 220, so as to prevent is interception or unauthorized use, for example. As discussed above, the identifier information can include key information, such as certificates and signatures. The statement generally represents a final expression of the persona.

The persona generation service 200 can sign the final version of a statement that represents the persona, as shown at 222. This digital signature can serve as an assertion to the authenticity of the persona for other services, principals, and/or resources that trust the persona generation service 200. The statement can also be signed by the principal receiving it or by a principal service.

Once the persona generation service 200 has generated the persona for the principal and has included a mechanism for the principal to acquire and access the statement representing the persona, the principal can advantageously use the information within the statement to securely and anonymously access a desired resource for which the persona was created, such as an online forum or blog. Since a single persona can include identifier information that can be validated and used with more than one desired resource, a single persona and statement can combine to provide a requesting principal with anonymous access to a multitude of different resources.

Exemplary Content

For purposes of the embodiments described herein, content (e.g., online contributions such as posted information) will generally be classified as either private content or public content, or some combination thereof.

As used herein, private content refers to content that is typically under the control of a particular user via one or more personas owned and/or operated by the user. The user (via one or more personas) may choose to guard such content and withhold it from an online community, for example.

As used herein, public content refers to content that is usually publicly available (e.g., with no access controls). However, such public content may owned by a single user or a specified group of groups of users (via one or more personas).

A third type of content, restricted content, can be considered to be either private content or public content, depending upon the situation. Restricted content generally refers to content that is provided to a user (via one or more personas) under some type of license or access control system (e.g., content that is considered to be proprietary or secret to a certain enterprise, for example).

Exemplary Content Searching Services

Content authored by a single user or a collection of users is generally attributed to a particular persona when submitted to a forum of interest (e.g., a blog or some other forum or repository on the Internet). It is desirable to maintain strict separation of personas for various reasons such as privacy and security. Therefore, once content is released into a forum, it should maintain its association with the corresponding persona and not be used by another persona.

Figure 3:
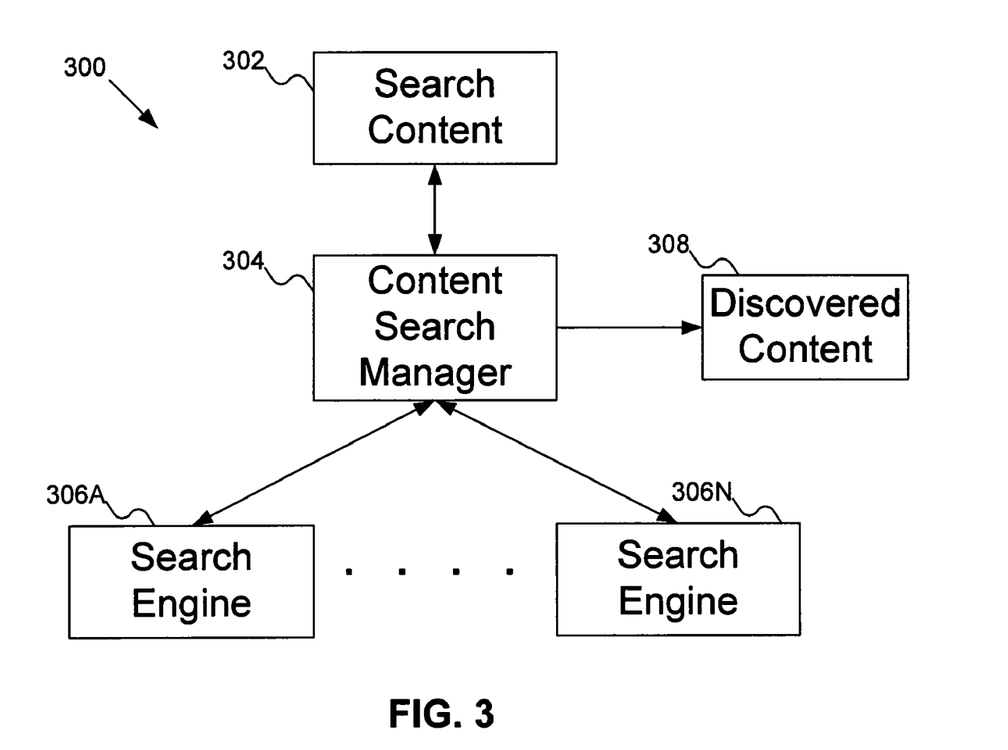
FIG. 3 shows an example of a content search service in accordance with embodiments of the disclosed technology.

FIG. 3 shows an example of a content search service 300 in accordance with embodiments of the disclosed technology. The content search service 300 can include search criteria 302, a content search manager 304, search engines 306A through 306N, and discovered content 308. Various aspects of the content search service 300 can be implemented in a tangible, machine-readable medium, for example.

A user can develop the search criteria 302 (e.g., template search criteria) to specify the type(s) of content (e.g., private and public) as well as certain attributes thereof to be searched. In certain embodiments, the search criteria 302 can be based on semantic abstracts or vectors. The search criteria 302 can also or alternatively be based on well-known search languages such as Yahoo! and Google, for example. In certain embodiments, the search criteria 302 can include a collection of any number of the techniques described herein.

In certain embodiments, the search criteria 302 can include an intent declaration (e.g., to help reduce the number of hits). Such an intent declaration can take the form of a number of communities of interest (e.g., as specified by the user) or semantic indicators that are resolvable via the search method being used. In certain embodiments, the search criteria 302 can be saved for future reuse. Such saved criteria can advantageously be combined with other saved criteria or pertinent information.

The search engines 306A through 306N can include commonly available search engines such as Yahoo! or Google, for example. The search engines 306A through 306N can also include private or subscription-based search engines that can search public content. The search engines 306A through 306N can also include private search engines that can access both public and private content but, because of a close association with the search manager 304, are not generally available to the public. One of ordinary skill in the art will recognize that embodiments of the disclosed technology can include virtually any number, composition, and arrangement of search engines and, therefore, are not limited to the example illustrated in FIG. 3.

A content search manager 304 can use the search criteria 302, in whole or in part, for interacting with the search engines 306A through 306N. For example, the content search manager 304 can coordinate submission of the search criteria 302, in whole or in part, to one or more of the search engines 306A through 306N. The content search manager 304 can provide as output the search results, which can be stored as discovered content 308. The discovered content 308 can correspond to the discovered content 106 of FIG. 1, for example.

In certain embodiments, the content search manager 304 can advantageously run various searches based on the search criteria 302 in accordance with a schedule (such as a schedule specified in the search criteria 302, for example). In other embodiments, any number of the search engines 306A through 306N can be set to automatically run the corresponding search or searches according to a schedule communicated from the content search manager 304. The schedule communicated by the content search manager 304 can be based on a schedule specified in the search criteria 302. The search criteria 302 can be used repeatedly, and the corresponding results can be advantageously integrated and correlated over virtually any given period of time.

Exemplary Semantic Analysis Services

Figure 4:
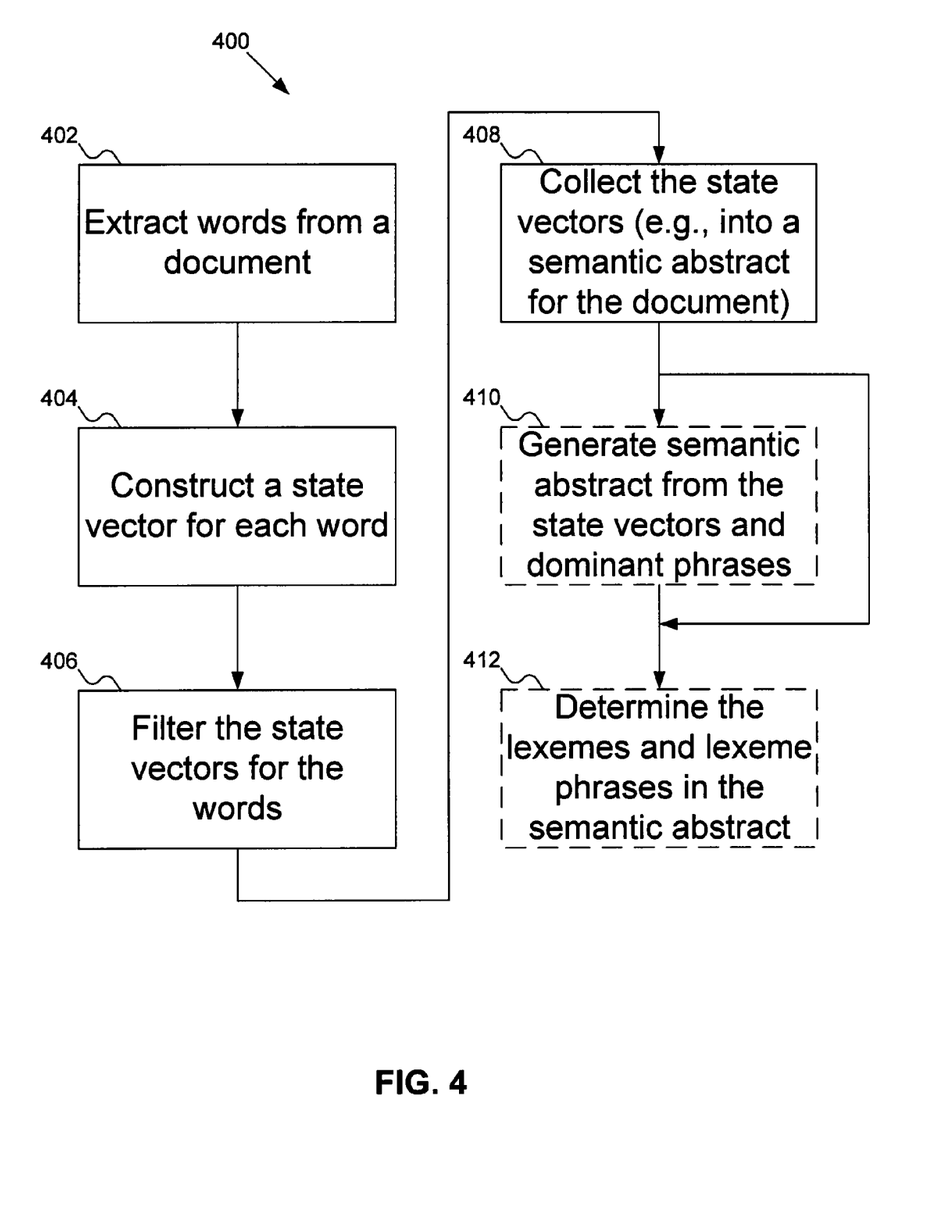
FIG. 4 shows a flowchart illustrating an example of a method of constructing a semantic abstract for a document based on dominant vectors.

FIG. 4 shows a flowchart illustrating an example of a method 400 of constructing a semantic abstract for a document based on dominant vectors. At 402, words are extracted from the document. The words can be extracted from the entire document or from only portions of the document (such as one of the abstracts of the document or the topic sentences of the document, for example). At 404, a state vector is constructed for each word extracted from the document. At 406, the state vectors are filtered to reduce the size of the resulting set, producing the dominant vectors. Finally, at 408, the filtered state vectors are collected into a semantic abstract for the document.

The dominant vectors and the dominant phrase vectors can be generated at any time before the semantic abstract is created. Once the dominant vectors and dominant phrase vectors are created, the original document is not necessarily required to construct the semantic abstract.

FIG. 4 shows two additional steps that are also possible in the example. At 410, the semantic abstract is generated from both the dominant vectors and the dominant phrase vectors. The semantic abstract can be generated by filtering the dominant vectors based on the dominant phrase vectors, by filtering the dominant phrase vectors based on the dominant vectors, or by combining the dominant vectors and the dominant phrase vectors in some way, for example. Finally, at 412, the lexeme and lexeme phrases corresponding to the state vectors in the semantic abstract are determined.

Figure 5:
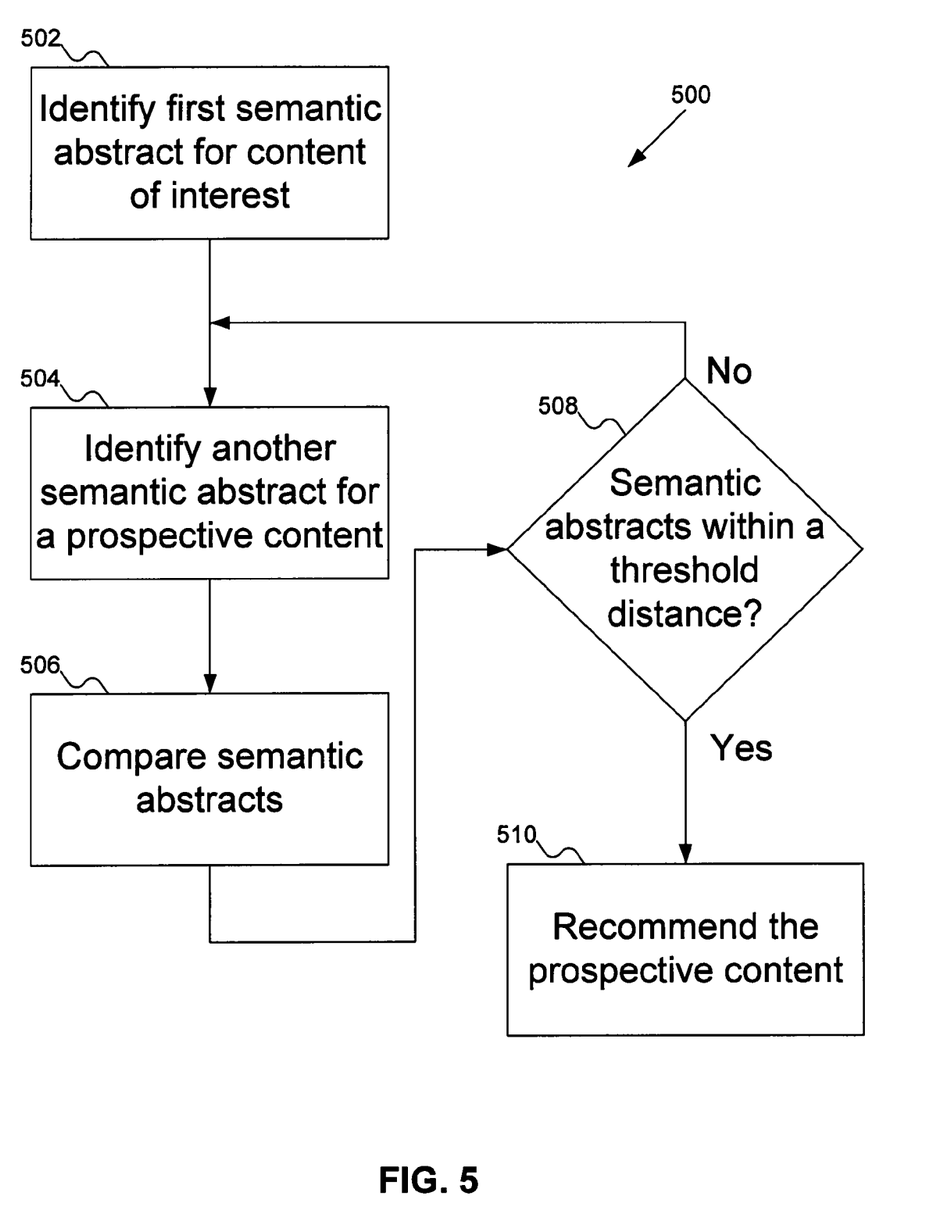
FIG. 5 shows a flowchart illustrating an example of a method of comparing two semantic abstracts and recommending a second content that is semantically similar to a content of interest.

FIG. 5 shows a flowchart illustrating an example of a method 500 of comparing two semantic abstracts and recommending a second content that is semantically similar to a content of interest. At 502, a semantic abstract for a content of interest is identified. At 504, another semantic abstract representing a prospective content is identified. In either or both 502 and 504, identifying the semantic abstract can include generating the semantic abstracts from the content, if appropriate. At 506, the semantic abstracts are compared. Next, a determination is made as to whether the semantic abstracts are "close," as shown at 508. In the example, a threshold distance is used to determine if the semantic abstracts are "close." However, one having ordinary skill in the art will recognize that there are various other ways in which two semantic abstracts can be deemed "close."

If the semantic abstracts are within the threshold distance, then the second content is recommended to the user on the basis of being semantically similar to the first content of interest, as shown at 510. If the other semantic abstracts is not within the threshold distance of the first semantic abstract, however, then the process returns to step 504, where yet another semantic abstract is identified for another prospective content. Alternatively, if no other content can be located that is "close" to the content of interest, processing can end.

In certain embodiments, the exemplary method 500 can be performed for multiple prospective contents at the same time. In the present example, all prospective contents corresponding to semantic abstracts within the threshold distance of the first semantic abstract can be recommended to the user. Alternatively, the content recommender can also recommend the prospective content with the semantic abstract nearest to the first semantic abstract.

Figure 6:
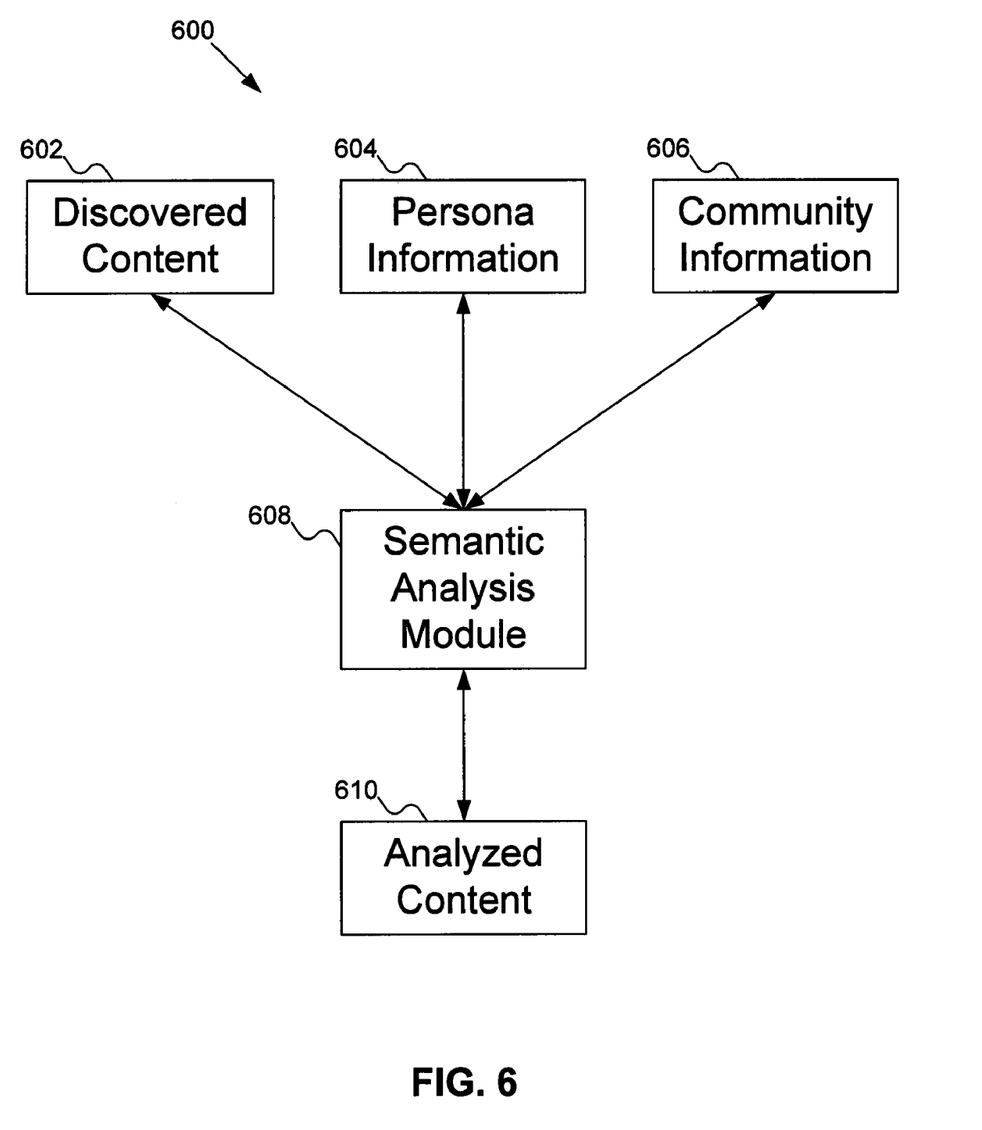
FIG. 6 shows an example of a semantic analysis service in accordance with embodiments of the disclosed technology.

FIG. 6 shows an example of a semantic analysis service 600 in accordance with embodiments of the disclosed technology. The semantic analysis service 600 can include discovered content 602, persona information 604, community information 606, a semantic analysis module 608, and analyzed content 610. Various aspects of the semantic analysis service 600 can be implemented in a tangible, machine-readable medium, for example.

In the example, the semantic analysis module 608 can evaluate the discovered content 602 and, based on the evaluating, produce the analyzed content 610. In certain embodiments, analysis of the discovered content 602 can be performed in conjunction with related content in the analyzed content 610 (e.g., content resulting from the same search criteria). The semantic analysis module 608 can include various types of analysis and correlation mechanisms (e.g., statistical analysis for correlation).

The semantic analysis module 608 can advantageously accumulate the analyzed content 610 using multiple iterations of search criteria that, in certain embodiments, can be modified based on the discovery of correlations within the analyzed content 610 (such as in situations where semantic abstracts are close or converging, for example). The semantic analysis module 608 is desirably targeted toward correlating the discovered content 602 (e.g., both current and past) with any associated identity information (not shown) specified for the pertinent persona(s). In embodiments where at least some of the discovered content 602 is correlated and attributes within the identity information are associated, for example, the pertinent event information can be stored as part of the analyzed content 610.

Exemplary Summary Generation Services

Figure 7:
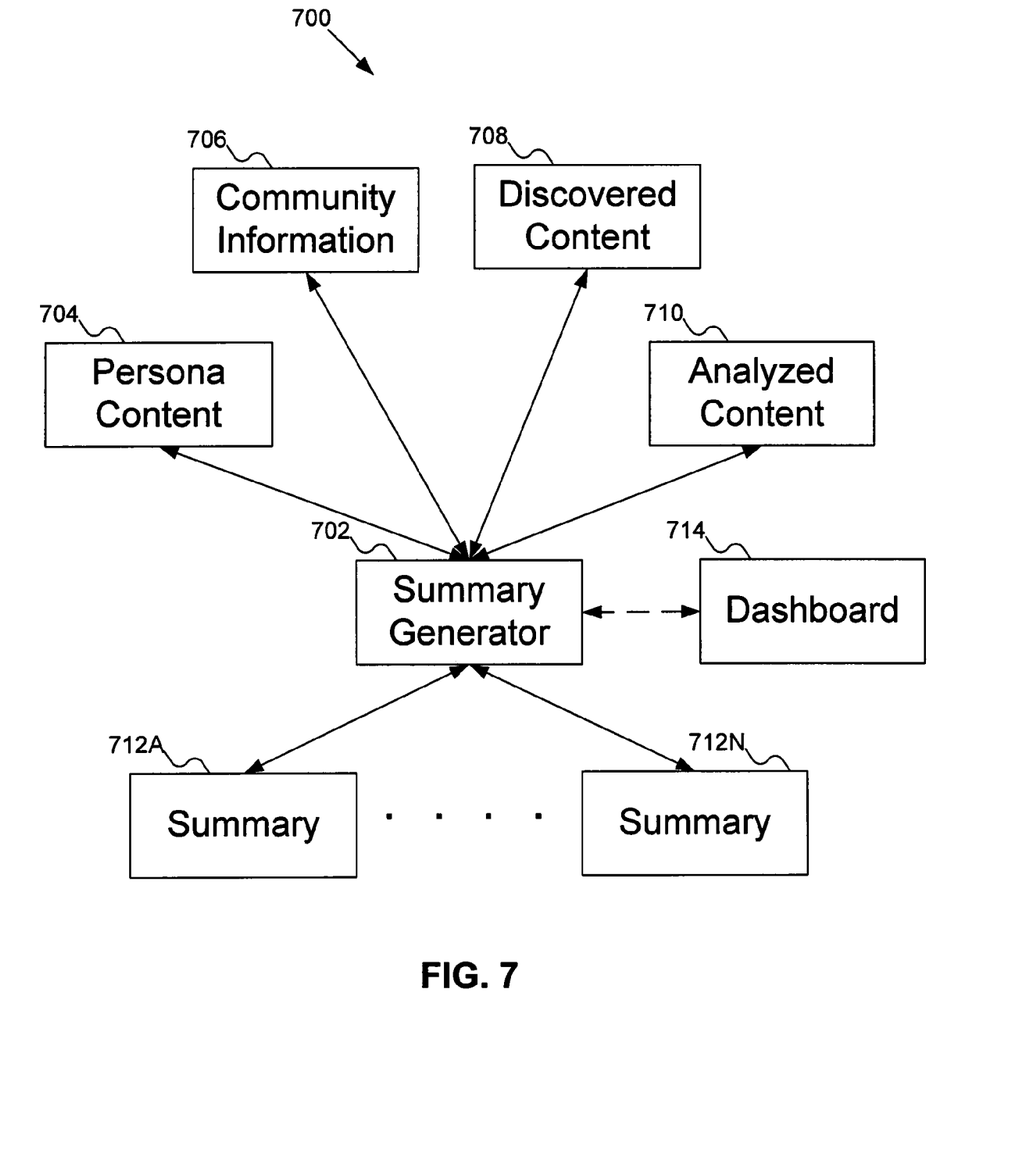
FIG. 7 shows an example of a summary generation service in accordance with embodiments of the disclosed technology.

FIG. 7 shows an example of a summary generation service 700 in accordance with embodiments of the disclosed technology. The summary generation service 700 can include a summary generation module 702, persona content 704, community information 706, discovered content 708, analyzed content 710, and one or more summaries 712A through 712N. Various aspects of the summary generation service 700 can be implemented in a tangible, machine-readable medium, for example.

The summary generation module 702 can access the discovered content 708 and analyzed content 710, for example, to produce the summaries 712A through 712N. The summaries 712A through 712N advantageously bring together the discovered content 708 and the analyzed content 710 in order to describe correlations to the user in light of a particular persona owned by the user. The summary generation module 702 can also make notations in certain content corresponding to a particular persona in order to associate certain content summary information, for example.

Figure 8:
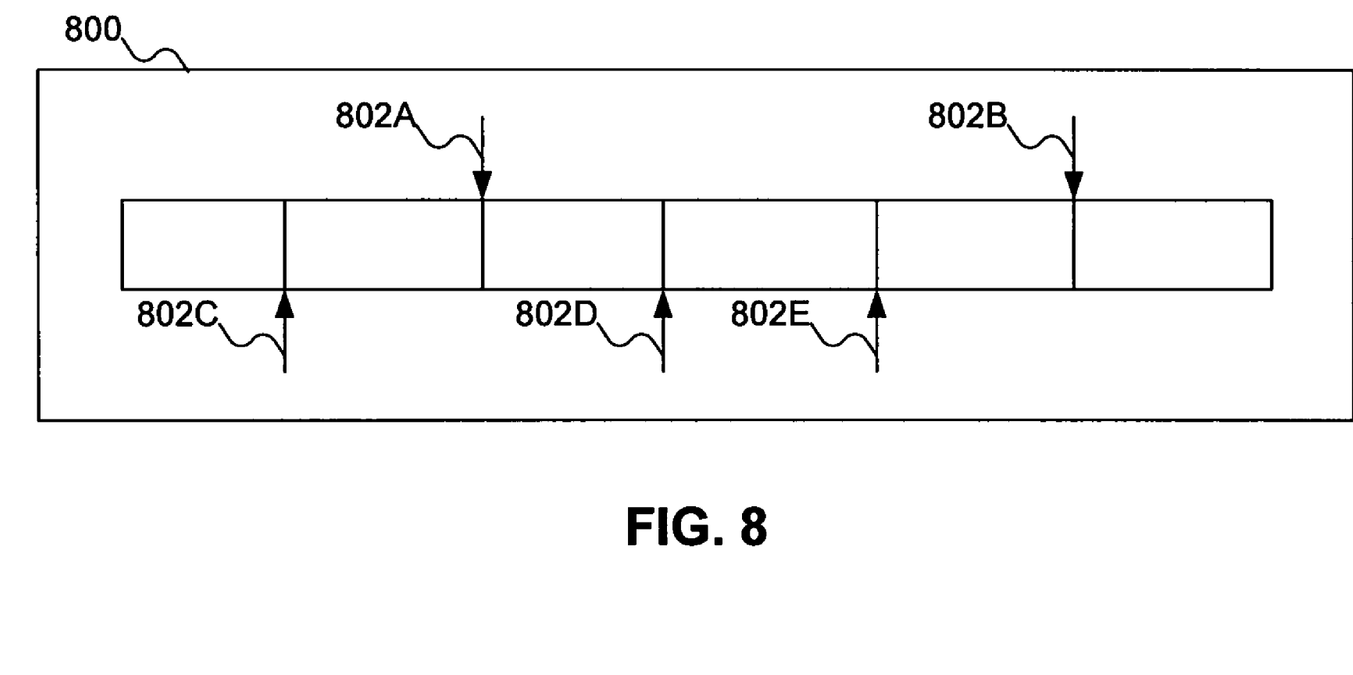
FIG. 8 shows an example of a dashboard in accordance with embodiments of the disclosed technology.

In certain embodiments, a dashboard can be used to provide a graphical representation of certain information pertaining to one or more of the summaries 712A through 712N. FIG. 8 shows an example of a dashboard 800 in accordance with embodiments of the disclosed technology. Status arrows 802A through 802N can be used, for example, to provide a graphical representation of an analysis showing how the discovered content relates to the semantic position of a certain one of a user's personas.

Figure 9:
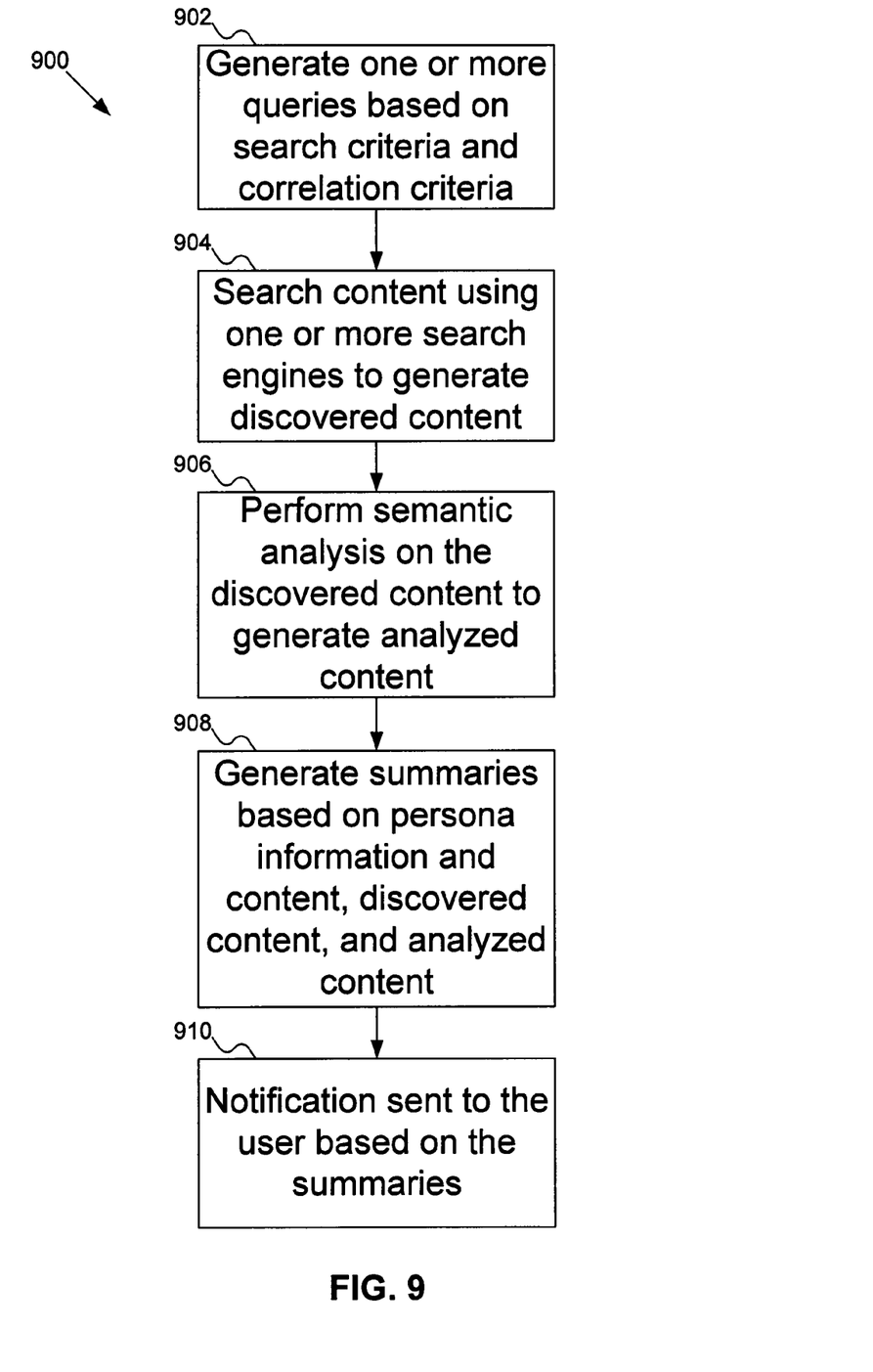
FIG. 9 shows an example of a content analysis and correlation method in accordance with embodiments of the disclosed technology.

Exemplary Methods in Accordance with Implementations of the Disclosed Technology FIG. 9 shows an example of a content analysis and correlation method 900 in accordance with embodiments of the disclosed technology.

At 902, a user can provide one or more search criteria and one or more correlation criteria to a content search manager that can in turn use the search criteria and correlation criteria to generate one or more queries and/or different types of query-related information. In alternative embodiments, some or all of the search criteria can be automatically determined and provided to the content search manager. The search criteria, correlation criteria, and/or queries can correspond to a single persona or to multiple personas.

At 904, the content search manager can coordinate with one or more search engines to perform one or more searches on content such as private or public content. The search engines can include commonly available search engines such as Google, for example. The content search manager can instruct the search engines as to what queries to run and when to run some or all of them. For example, some or all of the searches can be conducted continuously, at regular intervals, or in response to a particular action. Results of the searches can be stored and identified as discovered content. The discovered content can be updated at certain times or after each search, for example. The searches and/or discovered content can correspond to a single persona or to multiple personas.

At 906, a semantic analysis module can perform a semantic analysis on some or all of the discovered content. The semantic analysis module can access the discovered content or receive the pertinent discovered content as input, for example. Performing the semantic analysis can include generating semantic abstracts for some or all of the discovered content. Results of the semantic analysis can be stored and identified as analyzed content. The semantic analysis can correspond to a single persona or to multiple personas.

At 908, a summary generator can be used to generate summaries based on at least one of persona information (e.g., information pertaining to specific attributes of the persona itself or communities to which the persona belongs) and content (e.g., content attributed to the user that owns the corresponding persona), the discovered content, and the analyzed content. The summaries can be stored and identified as corresponding to a single persona or to multiple personas.

At 910, a notification can be sent to the owner of the pertinent persona(s). For example, the notification can provide the user with an indication as to the consensus surrounding a particular event. Such notifications can also inform the user as to how the consensus compares to the user's persona(s) or to what extent certain new content will increase confusion with respect to one or more of the user's personas. The notifications can be graphically displayed using a dashboard utility, for example. The notifications can also be updated over time. For example, as the consensus surrounding an event changes, so will the generated summaries and, as a result, the notifications based on the summaries.

Exemplary User Scenarios in Accordance with Implementations of the Disclosed Technology In an exemplary user scenario, a user becomes aware of a recently-issued statement in which the U.S. President expresses support for the destruction of all U.S. nuclear weapons. The user, whether Republican or Democrat, is interested in learning about reaction (favorable or not) to the President's statement so that the user can tailor a speech he or she is expected to present that day.

In the example, search criteria and correlation criteria pertaining to attributes of the U.S. government, particularly the President, and U.S. nuclear weapons, for example, can be created. Content can be searched (e.g., via search engines managed by a content search manager) using queries based on the search criteria and correlation criteria. The search results can be saved as discovered content.

A semantic analysis can be performed on the discovered content to generate analyzed content that can, in turn, be used (e.g., by a summary generation service) in the creation of summaries based on persona information and content, the discovered content, and the analyzed content. Such summaries can provide the user with information pertaining to reaction to the President's statement. More particularly, the summaries can provide the user with an idea as to how the consensus compares to the persona(s) in question.

General Description of a Suitable Machine in which Embodiments of the Disclosed Technology can be Implemented The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines can include computing devices such as personal computers, workstations, servers, portable computers, handheld devices, tablet devices, and the like.

Typically, a machine includes a system bus to which processors, memory (e.g., random access memory (RAM), read-only memory (ROM), and other state-preserving medium), storage devices, a video interface, and input/output interface ports can be attached. The machine can also include embedded controllers such as programmable or non-programmable logic devices or arrays, Application Specific Integrated Circuits, embedded computers, smart cards, and the like. The machine can be controlled, at least in part, by input from conventional input devices (e.g., keyboards and mice), as well as by directives received from another machine, interaction with a virtual reality (VR) environment, biometric feedback, or other input signal.

The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology can be described by reference to or in conjunction with associated data including functions, procedures, data structures, application programs, instructions, etc. that, when accessed by a machine, can result in the machine performing tasks or defining abstract data types or low-level hardware contexts. Associated data can be stored in, for example, volatile and/or nonvolatile memory (e.g., RAM and ROM) or in other storage devices and their associated storage media, which can include hard-drives, floppy-disks, optical storage, tapes, flash memory, memory sticks, digital video disks, biological storage, and other tangible, physical storage media.

Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A content analysis and correlation service system, comprising:
   a machine having a display;
   a summary manager service implemented in a tangible, machine-readable medium and configured to generate a plurality of content correlation summaries that are based at least in part on discovered content corresponding to a persona and analyzed content corresponding to the discovered content, the persona having a semantic position based on a plurality of state vectors within a topological vector space;
   a data store of the machine configured to store the generated plurality of content correlation summaries;
   a semantic analysis service configured to generate the analyzed content;
   a content search manager service configured to generate the discovered content based at least in part on a plurality of search criteria and correlation criteria, wherein the content search manager service is configured to generate the discovered content via a plurality of interactions with a plurality of search engines using at least some of the plurality of search criteria and correlation criteria; and
   a dashboard utility configured to graphically display information pertaining to at least some of the generated content correlation summaries by displaying on the display a plurality of status arrows that show how the discovered content relates to the semantic position of the persona.

2. The content analysis and correlation service system of claim 1, wherein the semantic analysis service is configured to generate the analyzed content based at least in part on a plurality of semantic abstracts, wherein the plurality of semantic abstracts are based at least in part on the discovered content and at least one of persona information and community information corresponding to the persona.

3. The content analysis and correlation service system of claim 2, wherein the community content comprises information pertaining to the persona's involvement with an online community.

4. The content analysis and correlation service system of claim 1, further comprising at least one identity service configured to generate the persona.

5. The content analysis and correlation service system of claim 1, wherein the plurality of search criteria and correlation criteria is developed by a user via a graphical user interface (GUI).

6. The content analysis and correlation service system of claim 1, further comprising a notification service configured to provide a notification based on the generated plurality of content correlation summaries.

7. The content analysis and correlation service system of claim 6, wherein the notification provides the user with information pertaining to a consensus pertaining to an event.

8. A computer-implemented method, comprising:
   searching content on a network based on a plurality of search criteria and correlation criteria and storing results as discovered content corresponding to a persona, the persona having a semantic position based on a plurality of state vectors within a topological vector space;
   performing a semantic analysis on at least part of the discovered content, wherein performing the semantic analysis comprises creating at least one semantic abstract corresponding to the discovered content, and wherein the at least one semantic abstract is based on a plurality of dominant vectors and a plurality of dominant phrase vectors;
   based at least in part on the discovered content and results of the semantic analysis, generating a plurality of content correlation summaries, wherein generating the plurality of content correlation summaries is also based at least in part on information pertaining to a persona;
   sending a notification to a user of the at least one persona, wherein the notification provides the user with at least one of information pertaining to a consensus pertaining to an event and information pertaining to a difference between the consensus and the persona; and
   displaying information pertaining to the plurality of content correlation summaries.

9. A content analysis and correlation system, comprising:
   a machine having a display;
   a content search module implemented in a tangible, machine-readable medium and configured to determine discovered content by searching at least one of public content and private content based at least in part on a plurality of search criteria and correlation criteria, wherein the discovered content corresponds to a persona having a semantic position based on a plurality of state vectors within a topological vector space;

a semantic analysis module implemented in the tangible, machine-readable medium and configured to generate analyzed content based at least in part on the discovered content;

a summary generation module implemented in the tangible, machine-readable medium and configured to generate a plurality of content correlation summaries based at least in part on the discovered content and the analyzed content; and a dashboard utility configured to use the display of the machine to display information pertaining to at least some of the plurality of content correlation summaries by displaying on the display a plurality of status arrows that show how the discovered content relates to a semantic position of at least one persona corresponding to a user.

10. The content analysis and correlation system of claim 9, further comprising a notification module configured to provide the user with information pertaining to a consensus pertaining to an event.

11. The content analysis and correlation system of claim 9, further comprising a notification module configured to provide the user with information pertaining to a difference between the consensus and the persona.

* * * * *